United States Patent [19]

Denny et al.

[11] Patent Number: 4,983,365

[45] Date of Patent: Jan. 8, 1991

[54] DESULPHURIZATION

[75] Inventors: Patrick J. Denny, Darlington; Peter J. H. Carnell, Stockton-on-Tees, both of England

[73] Assignee: Imperial Chemical Industries PLC, London, England

[21] Appl. No.: 430,947

[22] Filed: Nov. 2, 1989

Related U.S. Application Data

[63] Continuation of Ser. No. 188,104, Apr. 27, 1988, abandoned, which is a continuation of Ser. No. 386, Jan. 5, 1987, abandoned.

[51] Int. Cl.$^5$ .............................................. C01B 17/04
[52] U.S. Cl. ........................................ 423/230; 55/73; 502/34; 502/56; 502/517
[58] Field of Search ..................... 302/56, 517, 34; 423/230, 244; 55/73

[56] References Cited

U.S. PATENT DOCUMENTS

| | | | |
|---|---|---|---|
| 2,747,968 | 5/1956 | Pigache | 423/230 |
| 3,161,488 | 12/1964 | Eastwood et al. | 55/76 |
| 3,188,293 | 6/1965 | Bacon et al. | 502/34 |
| 3,313,722 | 4/1967 | Broughton | 208/310 R |
| 3,384,601 | 5/1968 | Price | 502/34 |
| 3,441,370 | 4/1969 | Gutmann et al. | 423/244 R |
| 3,492,083 | 1/1970 | Lowicki et al. | 502/56 |
| 3,702,884 | 11/1972 | Hunt et al. | 423/574 R |
| 3,725,299 | 4/1973 | Turnock et al. | 502/34 |
| 3,816,597 | 6/1974 | Smith | 502/517 |
| 3,832,445 | 8/1974 | Kouwenhoven | 423/244 R |
| 4,026,821 | 5/1977 | Schoofs et al. | 502/517 |
| 4,033,898 | 7/1977 | Jacobson et al. | 502/517 |
| 4,179,399 | 12/1979 | Lichtenberger et al. | 423/244 R |
| 4,180,554 | 12/1979 | Goddin et al. | 502/517 |
| 4,204,947 | 5/1980 | Jacobson et al. | 208/89 |
| 4,224,191 | 9/1980 | Bishop, III | 423/244 R |
| 4,427,642 | 1/1984 | Arashi et al. | 502/56 |
| 4,442,078 | 4/1984 | Jalan et al. | 423/231 |
| 4,442,221 | 4/1984 | Bishop et al. | 502/517 |
| 4,455,286 | 6/1984 | Young et al. | 423/244 R |
| 4,507,397 | 3/1985 | Buss | 502/517 |
| 4,533,529 | 8/1985 | Lee | 423/244 |
| 4,612,177 | 9/1986 | Kretchmer et al. | 423/244 R |
| 4,613,724 | 9/1986 | Debras et al. | 423/244 |
| 4,865,826 | 9/1989 | Carnell et al. | 502/56 |

*Primary Examiner*—Anthony McFarlane
*Attorney, Agent, or Firm*—Cushman, Darby & Cushman

[57] ABSTRACT

The absorption capacity of a desulphurizing absorbent bed is increased by temporarily increasing the temperature of the absorbent bed by at least 50° C. from the normal operating temperature to a maximum temperature not in an excess of 500° C.

11 Claims, No Drawings

DESULPHURIZATION

This is a continuation of application Ser. No. 07/188,104, filed Apr. 27, 1988, now abandoned, which is a continuation of 07/000,386, filed Jan. 5, 1987, now abandoned.

Desulphurisation

This invention relates to desulphurisation of feedstocks such as natural gas, or gases derived therefrom, and liquids or gases derived from oil or solid hydrocarbonaceous materials such as coal. Liquid feedstocks include LPG, naphthas, and kerosene.

BACKGROUND OF THE INVENTION

Desulphurisation of such feedstocks can be effected by passing the gas through a suitable absorbent which is commonly zinc oxide and/or copper oxide and is typically in the form of granules or pellets.

When a feedstock containing absorbable sulphur compounds such as hydrogen sulphide is passed through a bed absorbent, break-through of the sulphur compounds into the effluent occurs long before the bed has reached its theoretical absorption capacity, i.e. where all of the absorbent in the bed is fully saturated, because, while the absorbent near to the bed inlet may become fully, or nearly fully, saturated with the sulphur compounds, break-through occurs well before the absorbent at the bed outlet becomes saturated.

This early break-through is particularly noticeable where the absorption temperature is low. Recently absorbents having a high surface area, typically above 20, and particularly in the range 50 to 200, $m^2 g^{-1}$ have become available and are of particular use for low temperature desulphurisation, e.g. at temperatures between $-10°$ C. and 200° C. Even so premature breakthrough is a problem.

SUMMARY OF THE INVENTION

We have found that the absorption capacity of a bed of a desulphurisation absorbent can usefully be increased by a temporary increase in bed temperature.

Accordingly the present invention provides a method of desulphurising a liquid or gaseous feedstock wherein the feedstock is passed through a bed of a desulphurising absorbent characterised by temporarily increasing the temperature of the absorbent bed from the normal operating temperature by at least 50° C. to a temperature not in an excess of 500° C., preferably not in an excess of 400° C.

DETAILED DESCRIPTION OF THE INVENTION

The increase in temperature is preferably to a temperature in the range 150° to 350° C. and is preferably for a period of at least 1 hour. While benefits are obtained by the use of extended periods, e.g. 1 or more days, at the increased temperature, at increased temperatures above about 280° C., the higher the temperature, the shorter should be the time at that temperature, in order to avoid undue loss of surface area of the absorbent. For the aforesaid high surface area absorbents the maximum temperature is preferably below 300° C.

The maximum normal operating temperature, at which there is a noticeable benefit by temporary increase of the temperature, is about 300° C.: with the aforesaid high surface area absorbents the normal operating temperature is preferably below 250° C. and is preferably in the range 0° to 150° C.

The absorbent bed may be subjected to the temperature increase while on-line if the resultant increase in temperature of the desulphurised product is acceptable: however such a process also involves heating of the feedstock during at least part of the period of the increased temperature and economic considerations may render this an unacceptable mode of operation. Alternatively, and preferably, the absorbent bed is heated while the bed is off-line. Thus in a continuous process, two or more absorbent beds may be provided and while one or more beds remain on absorption duty one or more other beds are subjected to the temperature increase. Because of the heat capacity of the bed, in many cases it is not necessary to pass a fluid through the bed throughout the period for which the bed is to be subjected to an increased temperature: thus the bed may be heated via an external jacket, or by passing hot gas or liquid through the bed, until the desired maximum temperature has been achieved for a sufficient period and then the bed left static to cool down to the normal operating temperature.

In one particular form of the invention desulphurisation follows treatment of the feedstock with a molecular sieve to adsorb other impurities e.g. moisture. In such a case the molecular sieve adsorbent and the desulphurisation absorbent may be in the same vessel. Where regeneration of the molecular sieve adsorbent is effected by heating, the temporary heating of the desulphurisation absorbent may be effected at the same time as regeneration of the molecular sieve adsorbent. In a preferred form of the invention wherein a molecular sieve and an absorbent bed are employed in series, the regeneration of the molecular sieve and the temporary increase in temperature of the absorbent bed are effected by passage of a heated gas stream containing a combustible gas through the absorbent bed and through the molecular sieve. After leaving the absorbent bed and molecular sieve, the gas stream is combusted and the combustion products thereof are passed through a heat exchanger wherein heat is transferred to the gas stream employed for the regeneration step.

The time interval before the temporary heating of the desulphurisation absorbent becomes necessary will depend on the rate at which the absorbent becomes saturated, i.e. upon the absorbable sulphur compound content of the feedstock and the space velocity at which the feedstock is fed through the bed. Where the rate of sulphur pick up is very low, e.g. where the absorbable sulphur compounds content of the feedstock, and the space velocity, are low, little benefit may be obtained by the present invention. However such conditions are not normally encountered in commercial operations. The heating step should normally be effected before the sulphur break-through becomes significant.

The number of heating steps that can be employed before the bed needs recharging will depend on how saturated the bed is before each heating step and the severity, i.e. duration and temperature of the heat treatment. After a number of heat treatments, which may be as few as one, economic considerations may indicate that recharging is preferable to a further temporary temperature increase.

The sulphur compounds initially present usually include one or more of the following: $H_2S$, COS, and possibly $CS_2$, $CH_3SH$ and others such as diethyl sulphide or tetramethylene sulphide. The total initial concentration thereof is typically in the range 1—1000 ppm v/v calculated as sulphur-equivalent H₂S. The outlet sulphur compounds concentration is typically under 1 ppm, for example under 0.5 ppm, but this is a matter of design depending on the product user's requirement.

The absorbent material preferably comprises at least 60, especially at least 80, %$^w$/w of ZnO, calculated on its constituents non-volatile at 900° C. As used in the process, the zinc oxide may be, at least initially, wholly or partly hydrated or in the form of a salt of a weak acid. Typically the surface area of the solid material is at least 20, preferably in the range 50 to 200, $m^2g^{-1}$; and its pore volume is typically at least 0.2. A preferred solid material for the process is characterised further by an H₂S-adsorption capacity of at least 20, especially 35–80%, of the theoretical, at temperatures up to 120° C., as determined in a standard test in which a mixture of H₂S (2000 ppm v/v), CO₂ (4% v/v) and methane (balance) is passed over the solid material as 1 bar abs. pressure and a volume hourly space velocity of 1000.

The absorbent bed can be in the form of a fixed, liftable or fluidised bed.

EXAMPLES

The invention is illustrated by the following example:

In this example the absorbent comprised a bed of 60 ml of granules (of 3–5 mm diameter) of zinc oxide of surface are a 79 $m^2.g^{-1}$ inside a tube of 25 mm internal diameter and a mixture of natural gas, to which 5% v/v of hydrogen sulphide had been added, was used as the feedstock.

The feedstock was passed through the bed at 20° C. and at a space velocity of 700 $hr^{-1}$ at atmospheric pressure. Breakthrough of H₂S occurred 93 minutes after commencing the gas flow. Calculation showed that at this stage the average sulphur content of bed was 8.6% $^w$/w. Analysis confirmed this figure.

The gas flow was then stopped and, while still under a static atmosphere of the gas, the bed was heated to 200° C. for 6 hours and then allowed to cool to 20° C.

The gas flow was recommenced: break-through occurred 29 minutes later. The calculated average sulphur content of the bed was then 11.3% $^w$/w.

The gas flow was stopped and residual gas flushed out with nitrogen. The bed was then heated to 200° C. under a static nitrogen atmosphere for 16 hours and then allowed to cool to 20° C.

The gas flow was recommenced: break-through occurred 16 minutes later. The calculated average sulphur content of the bed was then 12.8%, while analysis gave a value of 12.3% $^w$/w.

It is seen that the two heat treatments enabled the absorption capacity of the bed to be increased by nearly 50%.

We claim:

1. A method of removing hydrogen sulphide from a liquid or gaseous feedstock containing hydrogen sulphide as an impurity wherein the feedstock is passed through a bed of a desulphurising absorbent consisting essentially of zinc oxide and having a surface area above 20 $m^2g^{-1}$, at a temperature in the range −10° to +200° C., and temporarily, for a period of 1 hour to 1 day, increasing the temperature of the absorbent bed from said temperature in the range −10° to +200° C. by at least 50° C. to a temperature not in an excess of 300° C.

2. A method of removing hydrogen sulphide from a liquid or gaseous feedstock containing hydrogen sulphide as an impurity comprising passing, at a first temperature, the feedstock through a bed of desulphurising absorbent comprising zinc oxide or copper oxide, or mixtures thereof, so that the absorbent absorbs hydrogen sulphide from said feedstock, characterized in that, in order that there is obtained an increase in the capacity of the bed for absorbing sulphur before unacceptable breakthrough of hydrogen sulphide in the treated feedstock leaving the bed occurs, after a period of absorption at said first temperature so that the average sulphur content of the bed attains a first level, the temperature of the absorbent bed is temporarily increased by at least 50° C. to a temperature not in an excess of 500° C. for a period of 1 hour to 1 day, the bed is then cooled to the first temperature, and thereafter passage of the feedstock is continued through the bed whereby the average sulphur content of the bed is increased from said first level to a second level.

3. A method according to claim 2, wherein the increase in temperature is to a temperature in the range 150° to 350° C.

4. A method according to claim 2 wherein the absorbent has a surface area above 20 $m^2.g^{-1}$, the first temperature is in the range −10° to +200° C., and the second temperature is below 300° C.

5. A method according to claim 2 wherein the absorbent has a surface area above 20 $m^2.g^{-1}$ and the first temperature is in the range 0° to 150° C.

6. A method according to claim 2 wherein at least two absorbent beds are employed and, while one bed of absorbent is on absorption duty wherein it is absorbing hydrogen sulphide from said feedstock, an other bed is subjected to the increase in temperature and then, after said other bed has been subjected to the temperature increase, said other bed is used to absorb hydrogen sulphide from said feedstock.

7. A method according to claim 2 wherein the feedstock contains an other impurity in addition to hydrogen sulphide, and said other impurity is absorbed from said feedstock by passage of said feedstock through a molecular sieve capable of absorbing said other impurity from said feedstock prior to passage of said feedstock through said bed of desulphurising absorbent and regeneration of the molecular sieve to remove said other impurity from said molecular sieve is effected by passing a heated gas stream therethrough, and the temporary increase in temperature of the bed of desulphurising absorbent is effected by passing the heated gas stream used for regeneration of the molecular sieve through the bed of desulphurising absorbent.

8. A method according to claim 7 wherein the molecular sieve and the absorbent bed are in the same vessel.

9. A method of removing hydrogen sulphide from a liquid or gaseous feedstock containing hydrogen sulphide as an impurity comprising passing the feedstock through a bed of a desulphurising absorbent comprising zinc oxide or copper oxide, or mixtures thereof, so that the absorbent absorbs hydrogen sulphide from said feedstock, characterized in that, in order that there is obtained an increase in the capacity of the bed for absorbing sulphur before unacceptable breakthrough of hydrogen sulphide in the treated feedstock leaving the bed occurs, after a period of absorption the temperature of the absorbent bed is increased by at least 50° C. to a temperature not in an excess of 500° C. for a period of 1 hour to 1 day without passing a fluid through the bed throughout the period during which the temperature is increased by at least 50° C.

10. A method of removing hydrogen sulphide from a liquid or gaseous feedstock containing hydrogen sulphide as an impurity comprising passing the feedstock through a bed of a desulphurising absorbent comprising zinc oxide or copper oxide, or mixtures thereof, so that the absorbent absorbs hydrogen sulphide from said feedstock, characterized in that there is obtained an increase in the capacity of the bed for absorbing sulphur before unacceptable breakthrough of hydrogen sulphide in the treated feedstock leaving the bed occurs, after a period of absorption the temperature of the absorbent bed is increased by at least 50° C. to a temperature not in an excess of 500° C. for a period of 1 hour to 1 day, said increase in temperature being effected by (a) combusting a gas stream containing a combustible gas, (b) heating said gas stream containing said combustible gas prior to combustion thereof by indirect heat exchange with the products of said combustion, and (c) passing said heated gas stream, prior to combustion thereof, through said bed.

11. A method of desulphurising a liquid or gaseous feedstock wherein the feedstock is passed through a bed of desulphurising absorbent consisting essentially of zinc oxide at a temperature in the range $-10°$ to 200° C., and temporarily, for a period of 1 hour to 1 day, increasing the temperature of the absorbent bed from the normal operating temperature by at least 50° C. to a temperature not in excess of 500° C.

* * * * *